(12) United States Patent
Bonney et al.

(10) Patent No.: US 6,466,953 B1
(45) Date of Patent: Oct. 15, 2002

(54) METHOD AND APPARATUS FOR HIERARCHICAL DRAWING SHEET MANAGEMENT

(75) Inventors: Christine M. Bonney, San Diego; William E. Bogan, Lakeside, both of CA (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 09/694,658

(22) Filed: Oct. 23, 2000

Related U.S. Application Data

(63) Continuation-in-part of application No. 09/076,583, filed on May 12, 1998, now abandoned.

(51) Int. Cl.[7] .............................................. G06F 17/30
(52) U.S. Cl. ........................ 707/502; 707/104.1; 707/10
(58) Field of Search ............................... 707/104, 103, 707/104.1, 10, 502; 700/97; 345/536

(56) References Cited

U.S. PATENT DOCUMENTS

| | | | | |
|---|---|---|---|---|
| 5,179,658 A | * | 1/1993 | Izawa et al. | 345/536 |
| 5,838,965 A | * | 11/1998 | Kavanagh et al. | 707/103 |
| 5,918,233 A | * | 6/1999 | Chance et al. | 707/104 |
| 6,134,338 A | * | 10/2000 | Solberg et al. | 382/113 |
| 6,243,611 B1 | * | 6/2001 | Hazama et al. | 700/97 |
| 2002/0035408 A1 | * | 3/2002 | Smith | 700/97 |

* cited by examiner

*Primary Examiner*—Charles L. Rones
(74) *Attorney, Agent, or Firm*—Columbia IP Law Group, PC

(57) ABSTRACT

The invention includes computer instructions that receive an indication of a manipulation of one or more graphical icons by a user, where the graphical icons are interrelated to one another representing a hierarchical relationship among multiple objects of one or more sheets, and the sheets are included within a drawing by a computer aided design (CAD) application program. The computer instructions operate to automatically modify at least sheet order information included within the objects of the one or more sheets reflecting the hierarchical relationship among the multiple objects of one or more sheets based, at least in part, upon the received indication. As a result, hierarchical information on multiple drawing sheets are dynamically updated when a user modifies the hierachical structure of the drawing sheets by manipulation icons representing the multiple drawing sheets, thereby saving the user effort in tracking the order information and opening each drawing sheet to modify the hierarchical information displayed on the drawing sheets. In one embodiment, the CAD application, including the computer instructions, is embodied in a distribution storage medium.

24 Claims, 8 Drawing Sheets

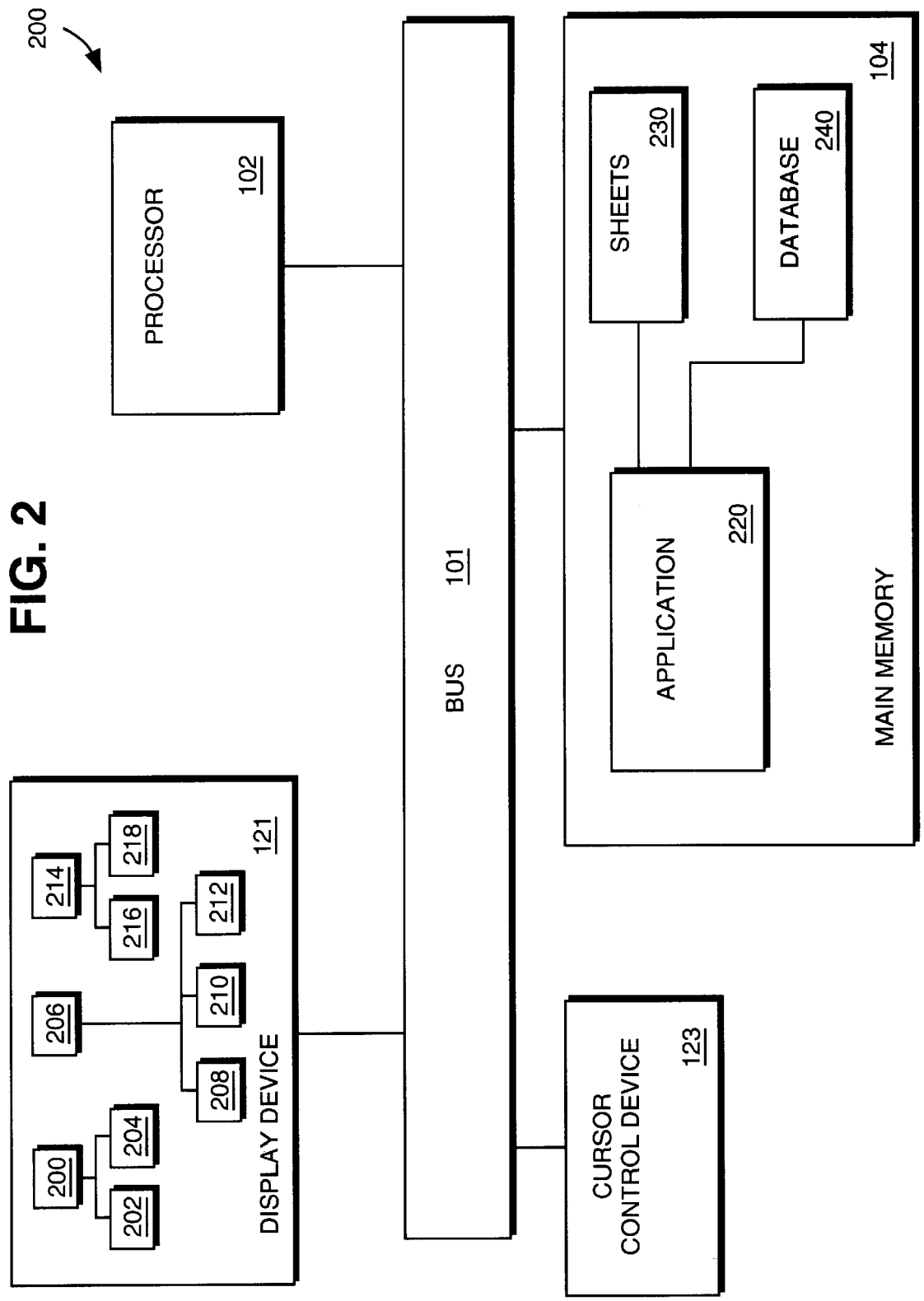

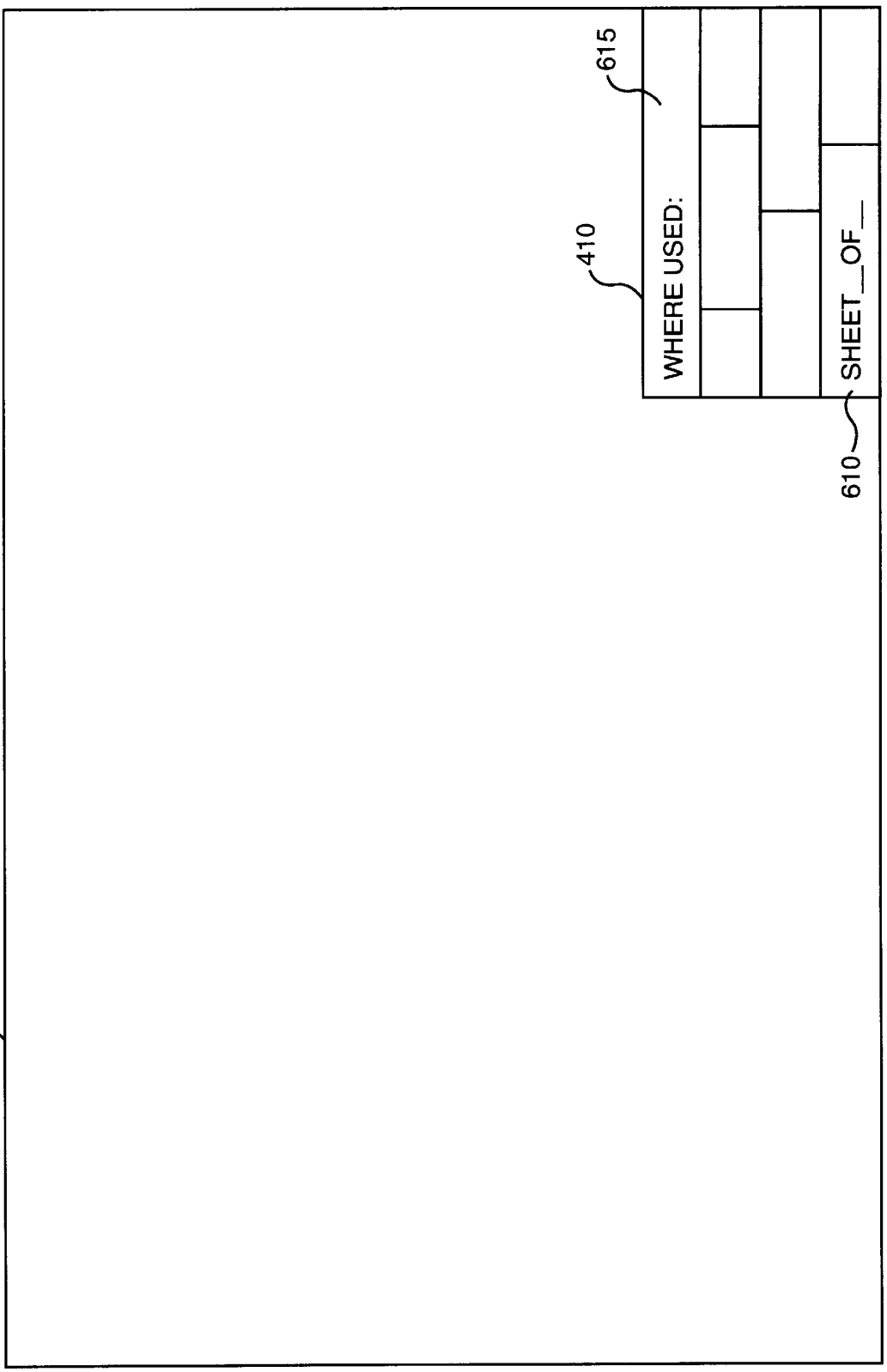

METHOD AND APPARATUS FOR HIERARCHICAL DRAWING SHEET MANAGEMENT

RELATED APPLICATIONS

This is a continuation-in-part of application Ser. No. 09/076,583, filed May 12, 1998, now abandoned.

FIELD OF THE INVENTION

The present invention relates to management of computer aided design (CAD) drawings. More particularly, the present invention relates to organization and management of hierarchical relationships sheets included within the CAD drawings.

BACKGROUND OF THE INVENTION

Once a designer completes a design using a computer aided design (CAD) application, often times, the designer proceeds to create drawings defining the design. Because these designs may be defined using geometric models, these drawings can be very complex and detailed depending upon the complexity of the geometric models. These drawings facilitate conveying of details of the models to people without requiring constant interrogation of the models using the CAD application.

Drawings, in general, may include many details of the models such as, but not limited to, alternative views, section views, detail views of certain aspects of each of the models, and in particular, assembly views to illustrate mating components of each of the models. Because so many aspects of the model(s) may be included within the drawing, the drawing may include many sheets, where each sheet illustrates a certain detail of a model. Depending upon the complexity of designs, a drawing may include numerous sheets showing many details.

For example, a design for a bicycle includes many components. The drawing may be the drawing for the entire bicycle with numerous drawing sheets illustrating the components making up the bicycle. The top level drawing sheet may be a view of the entire assembly, i.e., the fully assembled bicycle. Below this top level drawing sheet is one or more drawing sheets showing the many components making up the bicycle. These components, in turn, may have several drawing sheets below them showing the parts making up these components, and so forth. Additionally, the drawing sheets may show details of the individual parts, and a complex part may have to be illustrated in numerous drawing sheets. In order to accurately manage and use the drawing, the relationship between the drawing sheets must be created and maintained. Prior art CAD applications provide minimal support for managing the relationship between the drawing sheets.

For example, one way in which the relationships between the sheets may be cataloged is by generating a set of indices using the CAD application, whereby the indices illustrate the relationships between the sheets. However, if the relationships are changed, the indices have to be manually updated to reflect the changes in the sheets' relationships. Thus, a designer is required to devise his/her own procedure for tracking changes to the relationships between the sheets.

Thus, a more user-friendly approach for manipulating and updating sheets in a mechanical design, while maintaining the hierarchical relationships between the sheets is needed. As will be discussed in more detail below, the invention achieves these and other desirable objectives, which will be apparent from the disclosure to follow.

BRIEF DESCRIPTION OF THE DRAWINGS

The present invention is illustrated by way of example, and not by way of limitation, in the figures of the accompanying drawings in which like reference numerals refer to similar elements and in which:

FIG. 2 illustrates one embodiment of a computer system executing an application program that generates objects with a hierarchical relationship;

FIG. 6 illustrates a hierarchical relationship among multiple objects of one or more sheets, in accordance with the invention.

DETAILED DESCRIPTION

Figure 1:
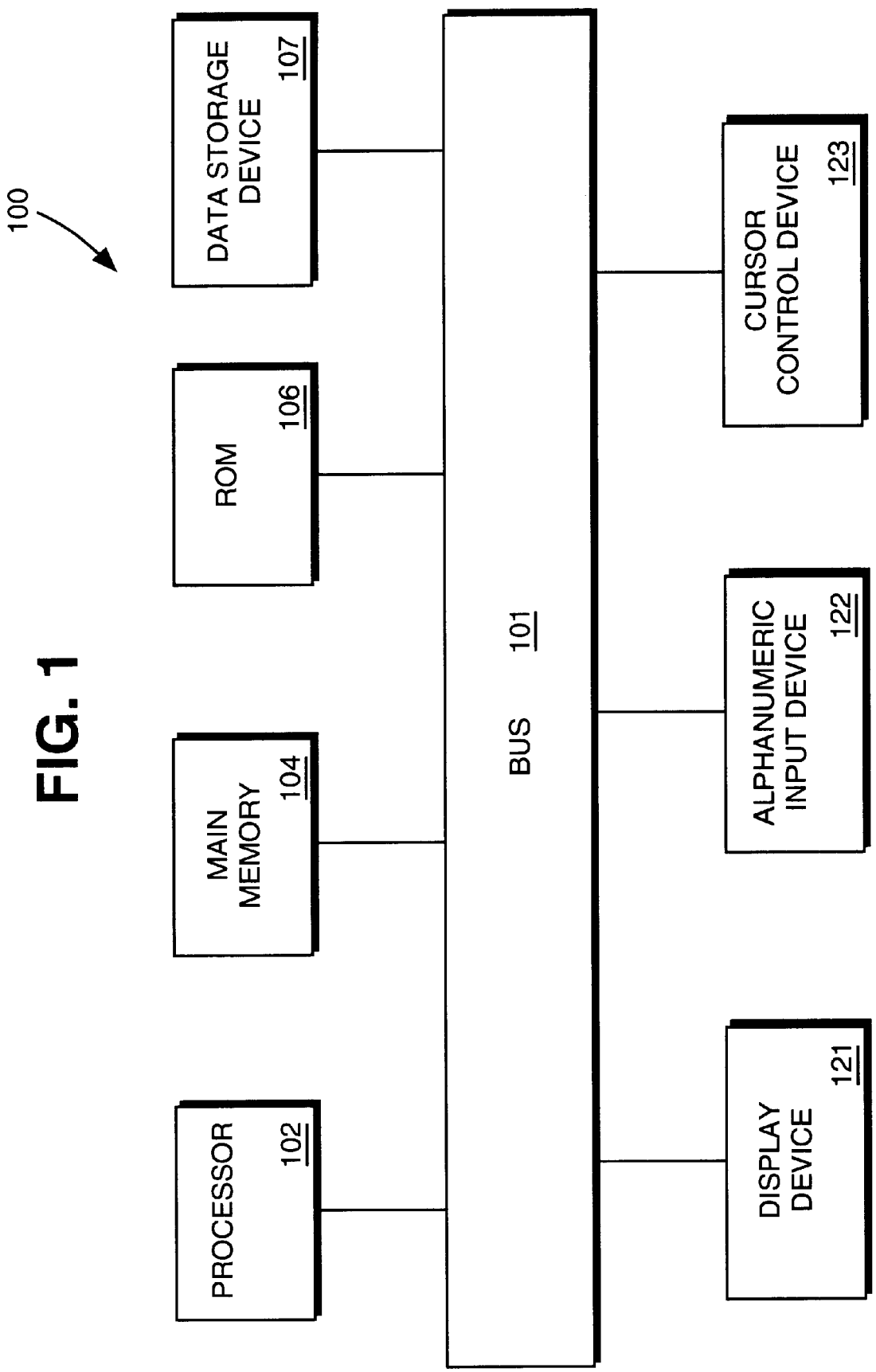
FIG. 1 illustrates one embodiment of a computer system.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention.

However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purposes as well as special purpose data processing machines, systems, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

The invention provides a method and apparatus for graphical display and management of hierarchical relationships between objects of drawing sheets created by a computer aided design (CAD) application. Briefly, the present invention allows a user of a computer-implemented application to define and modify one or more hierarchical relationships between multiple objects of drawing sheets generated by the CAD application. A user of the application to define or change relationships between the drawing sheet objects can graphically manipulate icons corresponding to drawing sheet objects. In one embodiment, the present invention also links descriptive fields in one or more icons to corresponding descriptive fields in the drawing sheet objects represented to update the icons automatically in response to the drawing sheet objects being changed. In one embodiment, drawing sheet objects can be moved between files by the user through manipulation of corresponding icons.

FIG. 1 is one embodiment of a computer system. Computer system 100 comprises bus 101 or other communication device for communicating information, and processor 102 coupled with bus 101 for processing information. Computer system 100 further comprises random access memory (RAM) or other dynamic storage device 104 (referred to as main memory), coupled to bus 101 for storing information and instructions to be executed by processor 102. Main memory 104 also can be used for storing temporary variables or other intermediate information during execution of instructions by processor 102. Computer system 100 also comprises read only memory (ROM) and/or other static storage device 106 coupled to bus 101 for storing static information and instructions for processor 102. Data storage device 107 is coupled to bus 101 for storing information and instructions.

Data storage device 107 such as magnetic disk or optical disc and its corresponding drive can be coupled to computer system 100. Computer system 100 can also be coupled via bus 101 to display device 121, such as a cathode ray tube (CRT) or liquid crystal display (LCD), for displaying information to a computer user. Alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121.

The present invention is related to the use of computer system 100 to manage and organize objects of drawing sheets of a CAD design having a hierarchical relationship. According to one embodiment, management and organization of the objects of the drawing sheets is performed by computer system 100 in response to processor 102 executing sequences of instructions contained in memory 104. The sequences of instructions implementing a CAD application. Execution of the sequences of instructions contained in memory 104 causes processor 102 to organize and manage the objects of the drawing sheets, as will be described hereafter. Instructions are provided to main memory 104 from a storage device, such as magnetic disk, CD-ROM, Digital Versatile Disc (DVD), via a remote connection (e.g., over a network), etc. In alternative embodiments, hard-wired circuitry can be used in place of or in combination with software instructions to implement the present invention. Thus, the present invention is not limited to any specific combination of hardware circuitry and software.

FIG. 2 is one embodiment of a computer system executing a CAD application program that generates objects of the drawing sheets of a design with a hierarchical relationship. While described in terms of computer-aided design (CAD) software, the present invention is not limited to use with CAD applications and files. For example, the present invention can be used to manage and organize inventories. Additionally, while described in terms of "sheets," the present invention is not limited to use with CAD sheets, and can be used with other types of objects.

In one embodiment, application 220, stored in main memory 104, is a CAD application, such as AutoCAD® or Mechanical Desktop®, both available from Autodesk, Incorporated of San Rafael, Calif. Of course, other CAD applications, or other types of applications could also be used. Application 220 generates sheets 230 that are stored in main memory 104 and also in one or more files of data storage device 107 of FIG. 1.

Application 220 can optionally retrieve or store data in database 240, or other application. Database 240 can, for example, store availability data related to each object 230. In the example of FIG. 2, application 220, sheets 230 and database 240 are stored in main memory 104. Alternatively, one or more of the components stored in main memory 104 can be stored on a mass storage device, a computer system accessed via a network, or other storage device.

As processor 102 executes sequences of instructions that define application 220, sheets 230 can be created, modified and/or deleted. Application 220 further includes sequences of instructions to graphically display and modify a relationship among sheets 230 on display device 121. In one embodiment, a user via cursor control device 123, or other device can manipulate graphical icons representing one or more of sheets 230, as well as other icons.

If, for example, application 220 is a CAD application, icons 202 and 204 can represent sheets stored in main memory 104 that describe in greater detail some component of the sheet corresponding to icon 200. The sheets corresponding to icons 206, 208, 210, 214, 216 and 218 can have similar relationships. Of course, other types of applications that generate objects that can have hierarchical relationships can be used for application 220.

In one embodiment, the relationship between two or more sheets can be manipulated graphically by using cursor control device 123. In the example of FIG. 2, icons 202 and 204 are child objects to icon 200. Similarly, icons 208, 210 and 212 are child objects to icon 206 and icons 216 and 218 are child objects to icon 214. In one embodiment, hierarchical relationships between sheets can be created, modified and/or deleted by dragging and dropping icons displayed on display device 121.

In addition to displaying hierarchical relationships between icons, application 220 can also include information about sheets 230 associated with the corresponding icons. In one embodiment, the information is updated dynamically in response to a user modifying a sheet. For example, various sheets of a drawing can have a revision number associated with the sheet and the icon corresponding to the sheet can include the revision number for display on display device 121. When the revision number is modified for the sheet stored in main memory, the revision number displayed on the icon is automatically updated. Of course, automatic update of information is not limited to revision numbers, part numbers, etc.

Figure 3B:
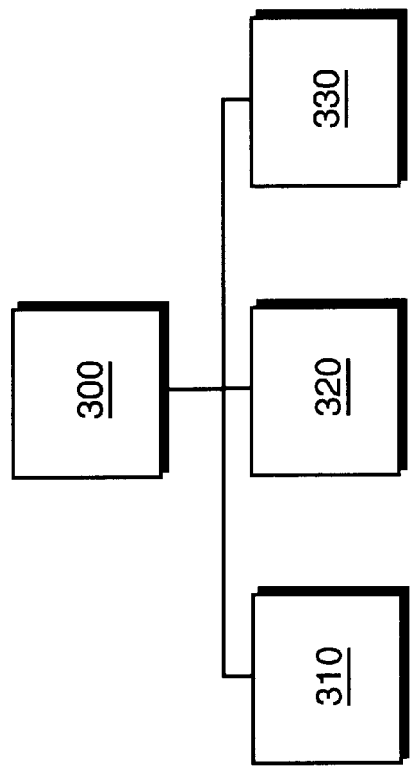
FIG. 3b illustrates one embodiment of a second relationship between drawing sheets.
Figure 3A:
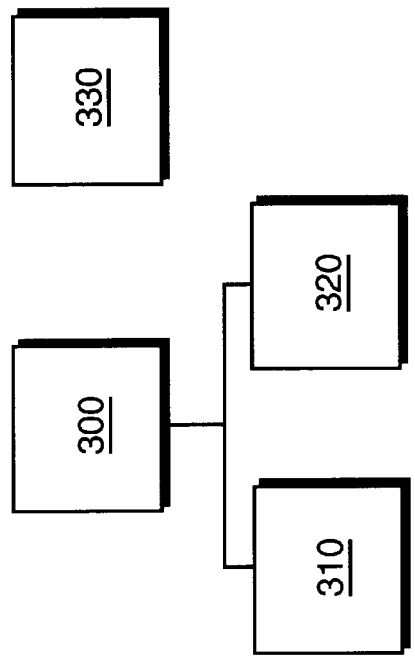
FIG. 3a illustrates one embodiment of a first relationship between drawing sheets.

FIG. 3a is one embodiment of a first relationship between drawing sheets. In the example of FIG. 3, icons 310 and 320 are child objects to icon 300. Icon 330 has no relationship with icons 300, 310 and 320. Thus, the sheet corresponding to icon 300 is the parent to the sheets that correspond to icons 310 and 320. The sheet corresponding to icon 330 has no relationship with the files corresponding to icons 300, 310 and 320.

In one embodiment, a user of a CAD application "draws" icons on a display device to represent sheets stored in memory or on a storage device. The icons can be drawn, for example, in the same manner as devices and components are drawn using the CAD application. The example of FIG. 3a describes icons in terms of boxes for simplicity; however, any icon, whether simple or complex can be used. Alternatively, a library of predefined icons can be provided so that the user is not required to draw icons.

Alternatively, icons are generated automatically by the CAD application. In such an embodiment, the first time the icons are displayed no hierarchical relationship is shown unless a hierarchical relationship has been defined in some other manner. The user can then drag and drop icons to define and/or change the relationship between sheets.

In one embodiment, the CAD application determines whether a linked field has been modified in a sheet at the time the file containing the sheet is closed. If so, the CAD application opens a file having the icons and updates the icon corresponding to the field that has been modified. Alternatively, the CAD application may update the file having the icons representing sheets prior to the modified file being closed.

Links between a field or object in a file and the icon representing sheet may be maintained in a variety of ways. For example, a table may be maintained by the CAD application that stores the fields that are linked between the sheet and the corresponding icon. When a field is modified, the table is checked to determine whether the field modified is linked to the corresponding icon. If so, the icon is updated to reflect the modification.

In one embodiment, icons are linked to the sheets represented. For example, in a CAD application, a drawing sheet typically includes a title block that includes such information as entity name, device name and/or description, date, revision number, etc. Icons can be linked to the sheets in memory such that changes made to the title block, or any other linked portion of the object, are updated on the corresponding icon. For example, if a drawing sheet is modified and the revision number is changed to reflect the modification, the revision number of the corresponding icon is also changed.

The hierarchical relationship can be used, for example, to define a print order. In a CAD application, the print order is based on the relationship between multiple sheets. A hierarchical relationship can exist when a drawing sheet provides further detail for all or a portion of a parent drawing sheet. Defining the print order is useful to provide an output in an organized and logical manner, which reduces sorting and organizing after printing.

In one embodiment, data that can be updated automatically in one application (e.g., a CAD application) is obtained from a different application (e.g., a database). For example, inventory quantities for a particular part or device can be maintained in a database (e.g., database 240 of FIG. 2) and linked to the corresponding CAD sheet describing the design of the object. This information can also be linked to the icon representing the drawing sheet. Thus, the icon maintains an indication of the number of various particular objects that are maintained in inventory. Of course, other uses can also be implemented.

FIG. 3b is one embodiment of a second relationship between drawing sheets. The relationship of FIG. 3b can be accomplished, for example, by dragging icon 330 from the position of FIG. 3a to a position over icon 300. As a result, icons 310, 320 and 330 become child objects to icon 330. Correspondingly, the sheet represented by icon 300 becomes the parent to the sheets represented by icons 310, 320 and 330.

Of course, many other types of relationship modifications can be accomplished by similar methods and the present invention is not limited to a small number of objects. Modification of relationships can also be accomplished by methods other than use of a cursor control device, such as typed commands, use of menus, etc.

It is important to note that sheets may be moved between files. For example, the sheets represented by icons 310, 320 and 330 may originally have been stored in a file while the sheet represented by icon 330 may have been stored in a separate file. After the user drags icon 330 to icon 310, the sheet represented by icon 330 is moved to the file containing the four sheets represented by icons 310, 320 and 330. Thus, a user may move sheets between files graphically.

Figure 4:
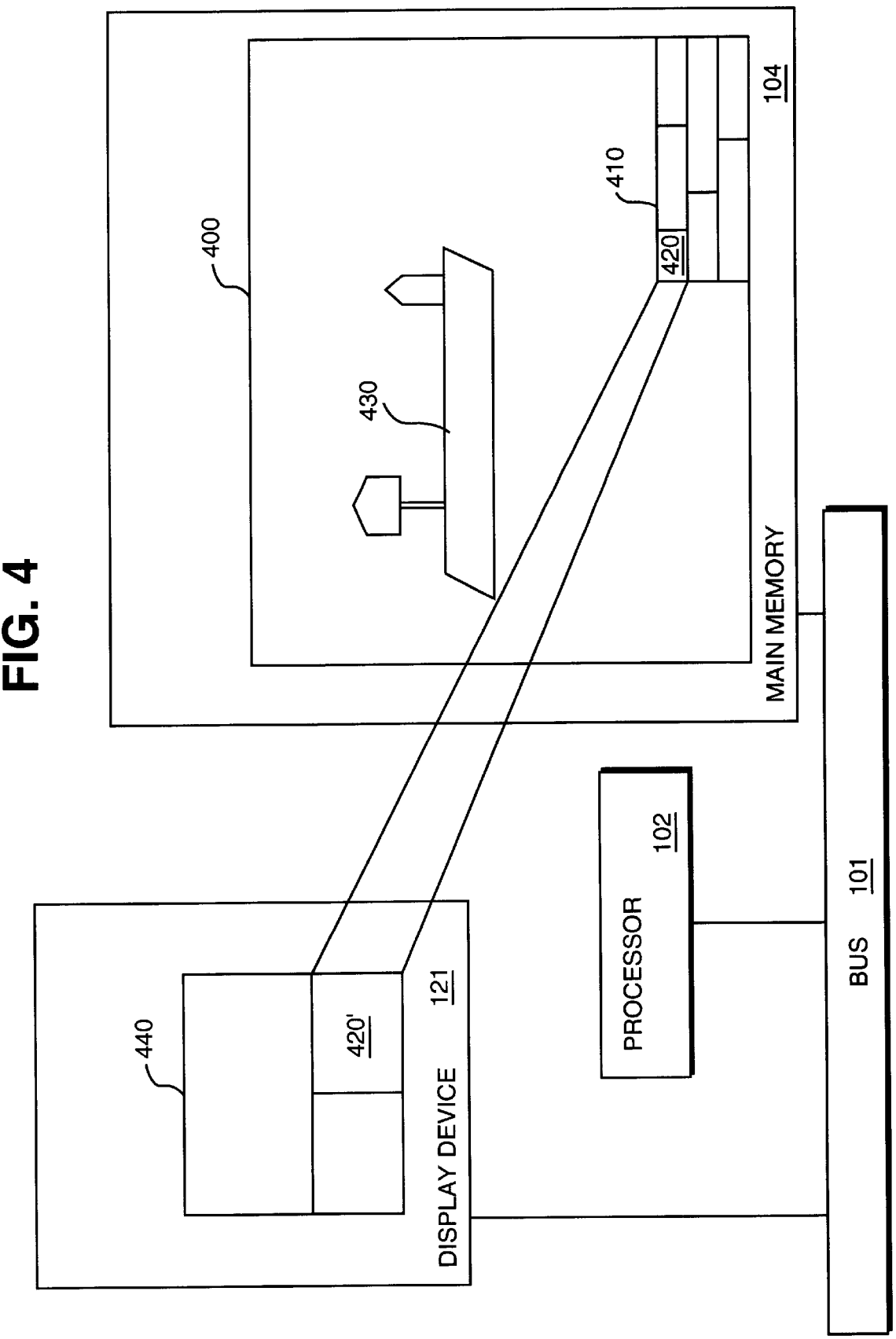
FIG. 4 illustrates one embodiment of an icon linked to an object.

FIG. 4 is one embodiment of an icon linked to an object. The example of FIG. 4 is described in terms of a single drawing sheet and a single corresponding icon for simplicity. Any number of sheets in memory and icons can be supported. Also, sheet 400 can be stored in a memory or storage device other than main memory 104. Main memory 104 stores sheet 400 includes a drawing of a device or some other representation within a CAD application 430. Sheet 400 also includes title block 410 having multiple fields including field 420. Display device 121 displays icon 440 representing sheet 400. Icon 440 includes filed 420' that is automatically updated when field 420 on sheet 400 is modified. Of course, a reverse update can also be provided. If field 420' of icon 440 is modified field 420 of sheet 400 can be automatically updated. Automatic updates are not limited to fields within title blocks. Any field or component of sheet 400 can be linked to icon 440.

Figure 5:
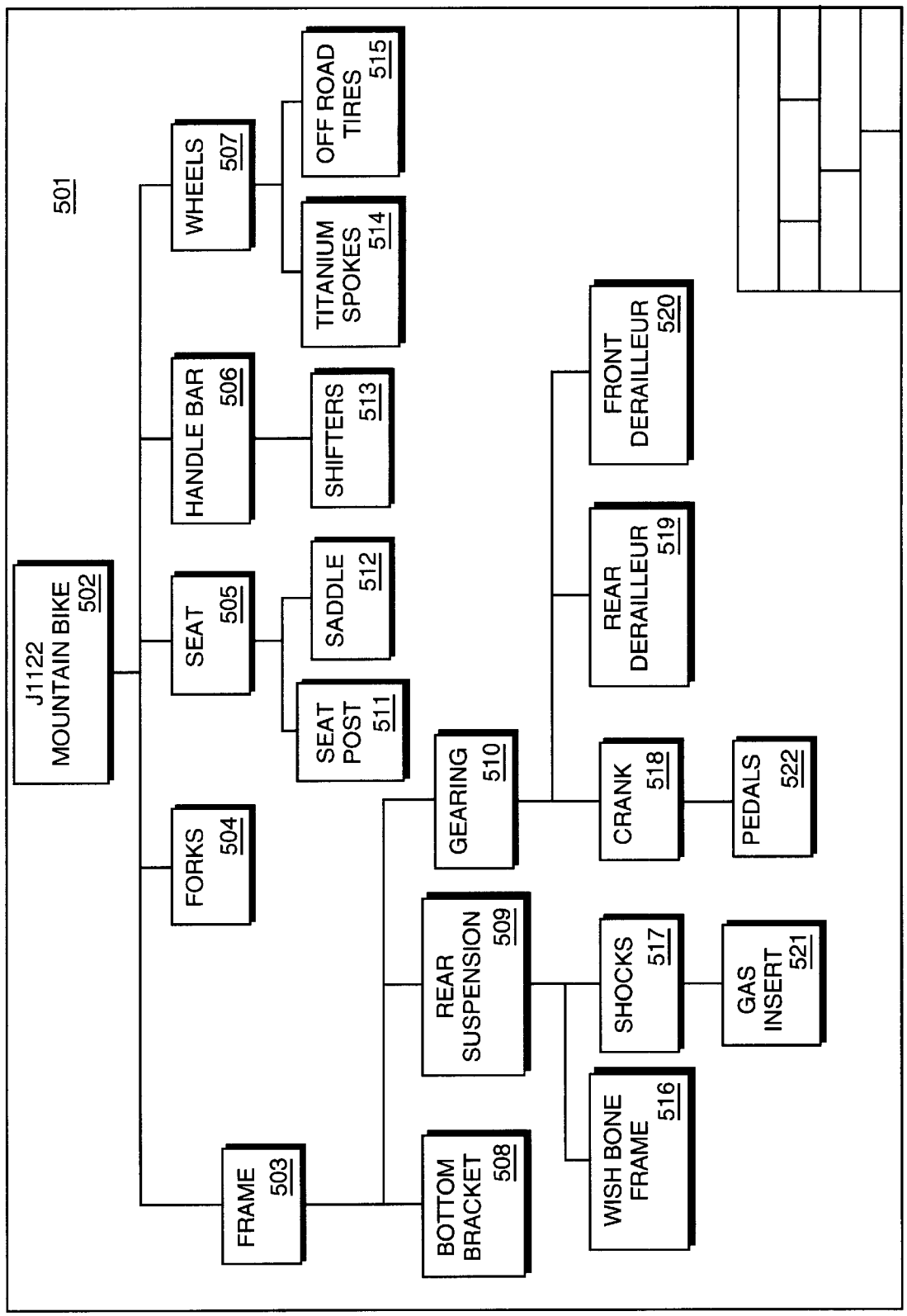
FIG. 5 illustrates a drawing of a design with a number of components upon which an embodiment of the invention may be practiced, for example a bicycle.

FIG. 5 illustrates a drawing of a design with a number of components upon which an embodiment of the invention may be practiced, for example a bicycle. Shown in FIG. 5, is a drawing 500 with drawing sheets represented as graphical icons 502–522 with the names of the components incorporated in the icons 502–522. In the one embodiment shown, the first drawing sheet 501 of the drawing 500 illustrates a hierarchical relationship among the drawing sheets 502–522. This first drawing sheet 501 reflecting the hierarchical relationships among the drawing sheets 502–522 may be a part of another drawing (not shown) of another file instead of the drawing 500. However, the links between the fields or objects in the file and the icons 502–522 representing the sheets are stored and maintained. In one embodiment, because the hierarchical relationships and the links are stored and maintained, the first drawing sheet 501 may be displayed or hidden. If the first drawing sheet 501 is to be displayed, the user may select a single selection for displaying the hierarchical drawing sheet within the CAD application program.

In FIG. 5, the top level drawing sheet 502 is a drawing sheet showing a final assembly, i.e., a complete bicycle (J1122 MOUNTAIN BIKE ) Below the top level drawing sheet 502 are second level drawing sheets 503–507 with each second level drawing sheet 503–507 showing components (FRAME, FORKS, SEAT, and so forth) making up the bicycle of the first level drawing sheet 502. And below these second level drawing sheets 503–507 are third, fourth, and fifth level drawing sheets 508–522 showing components (BOTTOM BRACKET, REAR SUSPENSION, GEARING, and so forth) making up the second level components 503–507. Shown in FIG. 5, the levels of drawing sheets 502–522 illustrate the many components with their hierarchical relationships, which may make up the bicycle. However, it should be appreciated that the hierarchical relationships among the components may be arranged in any manner desired by the designer.

FIG. 6 illustrates a hierarchical relationship among multiple objects of one or more sheets, in accordance with the invention. In FIG. 6, the drawing sheets 501–522 of the drawing 500 including title block 410 (shown in FIG. 4) has a field for a drawing sheet order 610 and a WHERE USED field 615. The drawing sheet order field 610 indicates information regarding the total number of drawing sheets for a drawing and a position of the drawing sheet within the total number of drawing sheets, for example, SHEET 2 OF 22. The WHERE USED field 615 indicates information regarding where the particular component shown in a particular sheet is used, for example, referring back to FIG. 5, for the REAR SUSPENSION drawing sheet 509, the WHERE USED field 615 may contain information such as, but not limited to, FRAME. That is, the REAR SUSPENSION drawing sheet 509 is one of the children of the parent, FRAME drawing sheet 503. In turn, the WHERE USED field 615 for the FRAME drawing sheet 503 may contain information such as, but not limited to, J1122 MOUNTAIN BIKE, indicating that the FRAME drawing sheet 503 is a child of the parent, J1122 MOUNTAIN BIKE drawing sheet 502, and so forth. In the illustrated embodiment, the WHERE USED field 615 indicates a hierarchical relationship where the drawing sheet immediately above a drawing sheet is a parent drawing sheet; however, it should be appreciated that the hierarchical relationship is based at least on the hierarchical relationships created by the user.

The drawing sheet order field 610 for each of the drawing sheets 502–522 (shown in FIG. 5) may be ordered from left to right of the drawing sheet 501 showing the hierarchical relationship among the components. For example, FRAME drawing sheet 503 may have, within the drawing sheet order field 610, the information, SHEET 3 OF 22, FORKS drawing sheet 504 may have, within the drawing sheet order field 610, the information, SHEET 4 OF 22, WHEELS drawing sheet 507 may have, within the drawing sheet order field 610, the information, SHEET 7 OF 22, and so forth. Shown in FIG. 5, the drawing sheet order is from left to right; however, it should be appreciated by those skilled in the art that the drawing sheet order may be based at least in part on the designer.

Figures 7A, 7B:
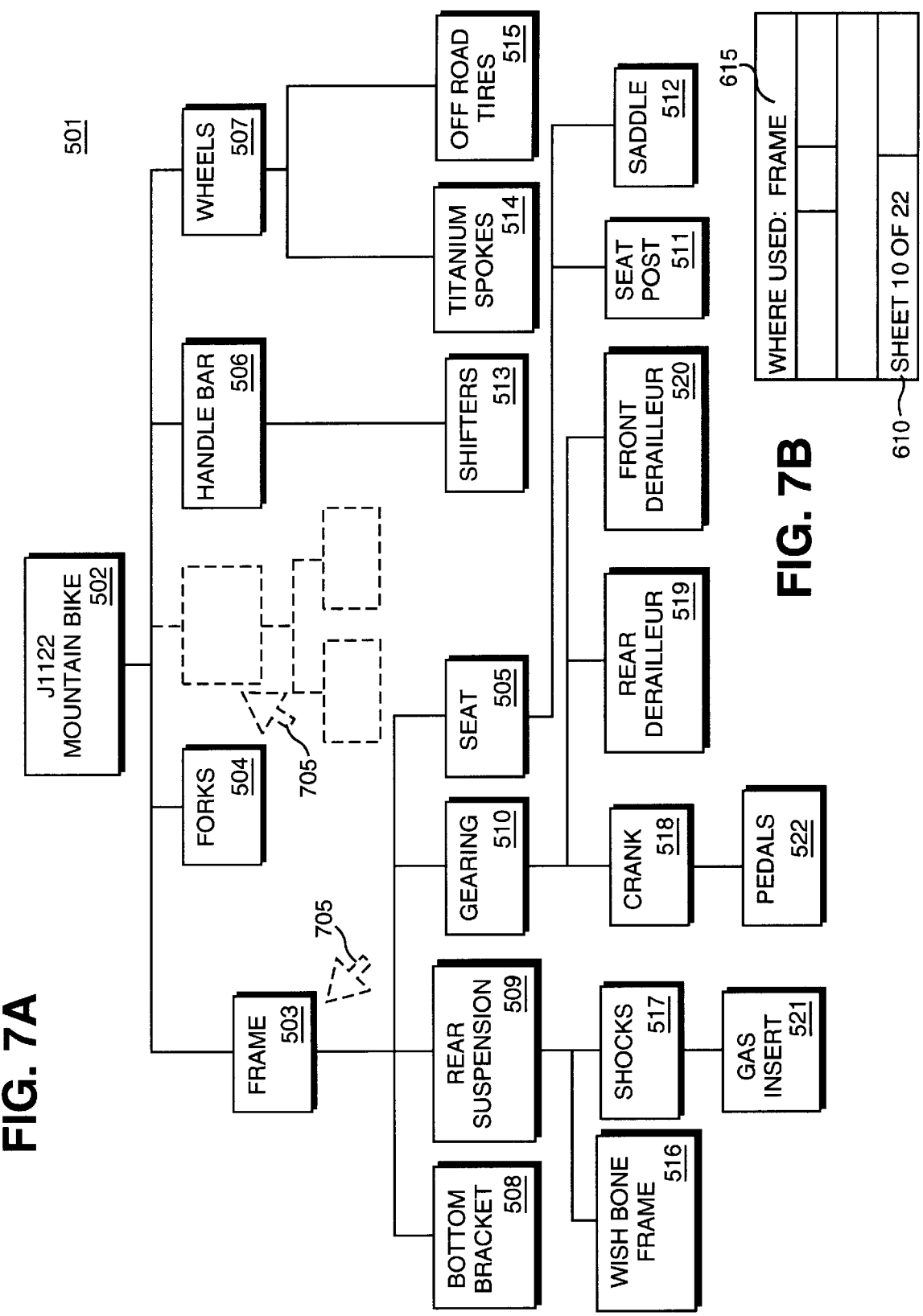
FIGS. 7a and 7b illustrate modifying a hierarchical relationship among multiple objects of one or more sheets by manipulation of graphical icons representing the hierarchical relationship, in accordance with one embodiment of the invention.

FIGS. 7a and 7b illustrate modifying a hierarchical relationship among multiple objects of one or more sheets by manipulation of graphical icons representing the hierarchical relationship, in accordance with one embodiment of the invention. In one embodiment shown in FIG. 7a, a user manipulates the graphical icons representing the drawing sheets 502–522 by dragging and dropping the icons to change the relationship among the drawing sheets 502–522.

In FIG. 7a, cursor 705 is used to select the SEAT drawing sheet 505, and the SEAT drawing sheet 505 is dragged and dropped below the FRAME drawing sheet 503, thereby changing the hierarchical relationship among the drawing sheets 502–522. As shown in FIG. 7, after the SEAT drawing sheet 505 is dragged and dropped below the FRAME drawing sheet 503, the SEAT drawing sheet 505, with its component drawing sheets 511 and 512, becomes a component of the FRAME drawing sheet 503, and thus a child of the FRAME drawing sheet 503.

In one embodiment shown in FIG. 7b, based at least on the manipulation of the drawing sheets 502–522 that change the hierarchical relationship among the drawing sheets 502–522, the WHERE USED field 615 and the drawing sheet order field 610 are dynamically updated to reflect the new hierachical relationship among the drawing sheets 502–522.

In FIG. 7b, the drawing sheet order field 610 for SEAT drawing sheet 505 is modified to indicate that the SEAT drawing sheet 505 is now SHEET 10 OF 22. The SEAT drawing sheet 505 order is modified to SHEET 10 OF 22 because, as discussed above, the user selected to order the drawing sheets 502–522 from left to right. Previous to the manipulation of the icons representing the drawing sheets 502–522, the SEAT drawing sheet 505 was ordered as SHEET 5 OF 22. Accordingly, the SEAT POST drawing sheet 511 and the SADDLE drawing sheet 512 orders are modified from SHEET 11 OF 22 and SHEET 12 OF 22 to SHEET 19 OF 22 and SHEET 20 OF 22, respectively. Furthermore, in one embodiment, the drawing sheet order fields of all of the drawing sheets 502–522 may be modified to reflect the change in the hierarchical relationship among the drawing sheets 502–522.

The WHERE USED field 615 of the SEAT drawing sheet 505 is also modified to reflect that the change in the hierarchical relationships among the drawing sheets 502–522. As shown in FIG. 7b, the WHERE USED field 615 of the SEAT drawing sheet 505 is modified from J1122 MOUNTAIN BIKE to FRAME indicating that the immediate parent of the SEAT drawing sheet 505 is the FRAME drawing sheet 503. However, the WHERE USED fields of the SEAT POST drawing sheet 511 and the SADDLE drawing sheet 512 remain the SEAT because the SEAT POST drawing sheet 511 and the SADDLE drawing sheet 512 remains the child of the SEAT drawing sheet 505, i.e., their hierarchical relationships are maintained. In changing the hierarchical structure, as described, utilizing the FRAME drawing sheet 503 and the SEAT drawing sheet 505 in a different bicycle assembly may be facilitated, for example, same components of the FRAME and the SEAT may be part of another model of bicycle.

As a result, hierarchical information on multiple drawing sheets are dynamically updated when a user modifies the hierarchical structure of the drawing sheets by manipulating icons representing the multiple drawing sheets, thereby saving the user effort in tracking the relationship, opening each manipulated drawing sheet, and modifying the hierarchical information displayed on the drawing sheets.

Figure 8:
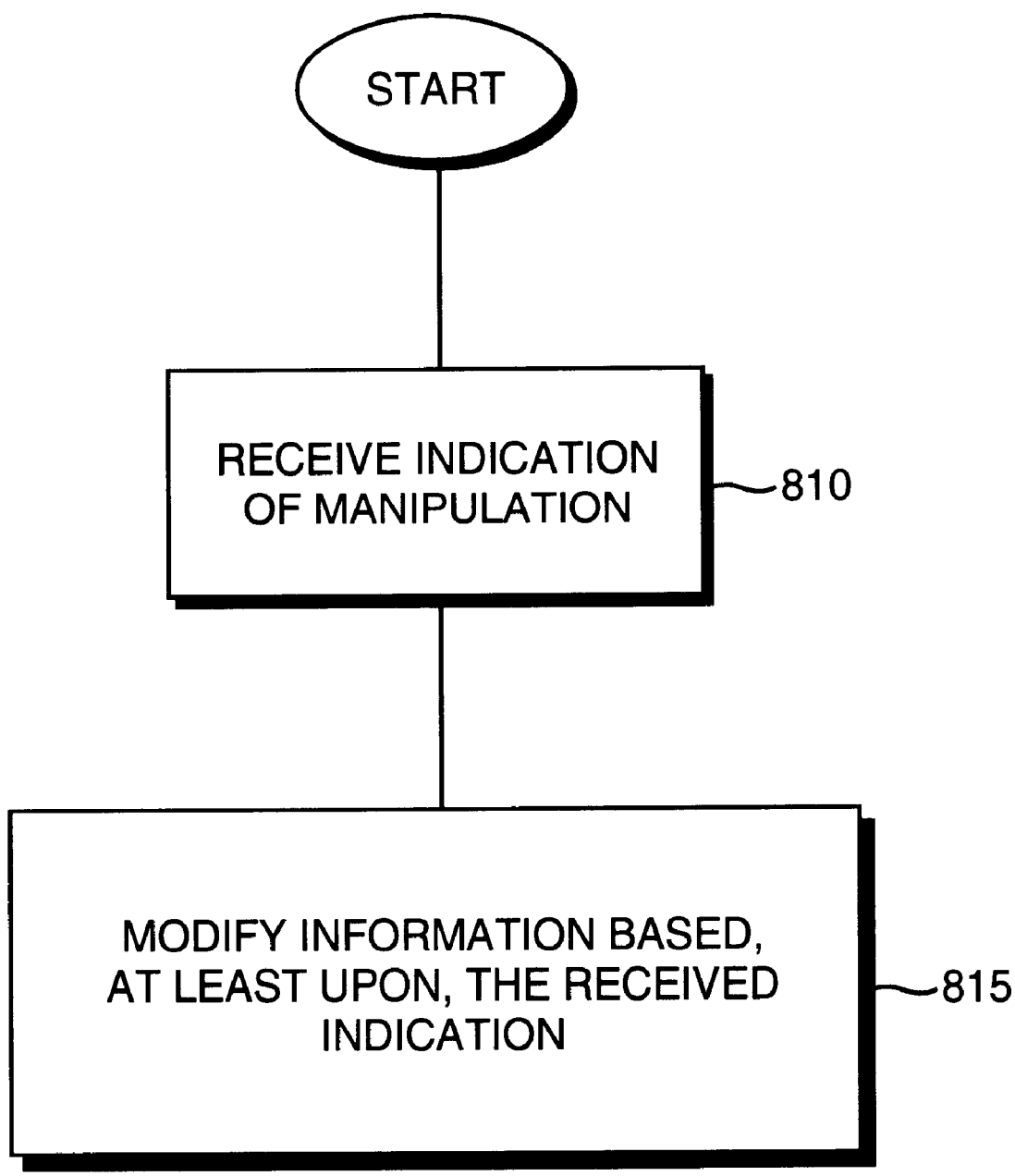
FIG. 8 illustrates the operational flows of one embodiment of the application 220 in accordance with the invention.

FIG. 8 illustrates the operational flows of one embodiment of the application 220 in accordance with the invention. As previously discussed, for the illustrated embodiment, the application 220 is also programmed in an event driven model, i.e., the application 220 is designed to be executed in a system environment where various even notification services are available from the operating system. One example of such an operating system suitable for practicing the invention is the Windows® operating systems, available from Microsoft Corporation of Redmond, Wash. In alternate embodiments, the application 220 may be implemented in other programming approaches known in the art.

In FIG. 8, the application 220 receives an indication of a manipulation of one or more graphical icons by a user (810). The graphical icons to represent a hierarchical relationship among multiple objects of one or more sheets, which are included within a drawing by a computer aided design (CAD) application program.

As shown in FIG. 8, responsive to an event notification informing the application 220 that the indication of the manipulation of one or more graphical icons has been received, the application 220 modifies the information reflecting the hierarchical relationship among the multiple objects of the one or more sheets (815). The modifications of the information is based, at least in part, upon the received indication.

As a result, hierarchical information on multiple drawing sheets are dynamically updated when a user modifies the hierarchical structure of the drawing sheets by manipulating icons representing the multiple drawing sheets, thereby saving the user effort in opening each manipulated drawing sheet, and modifying the hierarchical information displayed on the drawing sheets.

In the foregoing specification, the present invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

Thus, a more user-friendly approach for manipulating and updating sheets in a mechanical design, while maintaining the hierarchical relationships between the sheets has been described.

What is claimed is:

1. A method comprising:

receiving an indication of a manipulation of one or more graphic icons by a user, said graphical icons being interrelated to one another representing a hierarchical relationship among multiple objects of one of more sheets, said one or more sheets being included within a drawing by a computer aided design (CAD) application program;

automatically modifying a graphical representation representing the hierarchical relationships of the multiple objects; and automatically modifying at least sheet order information included within said objects of the one or more sheets reflecting said hierarchical relationship among the multiple objects of the one or more sheets based, at least in part, upon said received indication.

2. The method of claim 1, said automatic modification comprises dynamically updating the drawing sheets by the CAD application program to reflect the order changes resulted from the manipulation of the one or more graphical icons by the user.

3. The method of claim 2, wherein said automatic modification comprises dynamically updating of usage information of the drawing sheets by the CAD application.

4. The method of claim 3, wherein said dynamically updating of the drawing sheets comprises modifying a "where used" field of the one or more drawing sheets.

5. The method of claim 1, further comprising storing data representing the hierarchical relationship in a storage device.

6. The method of claim 5, wherein said storing of data representing said hierarchical relationship comprises storing data linking the one or more graphical icons of the objects of the one or more sheets included within the drawing by the CAD application program.

7. The method of claim 1, wherein the indication of manipulation comprises an indication of the user defining and/or changing usage relationships of the components represented by the multiple objects of the one or more sheets.

8. The method of claim 7, wherein the indication of defining and/or changing of usage relationships comprises an indication of the user dragging and dropping selected ones of the one or more icons among the multiple ones of the one or more objects.

9. A storage medium having stored therein a plurality of instructions that are machine executable, wherein when executed, said executing instructions operate to receive an indication of a manipulation of one or more graphical icons by a user, said graphical icons being interrelated to one another representing a hierarchical relationship among multiple objects of one or more sheets, said one or more sheets being included within a drawing by a computer aided design (CAD) application program, automatically modify a graphical representation representing the hierarchical relationship of the multiple objects, and to automatically modify at least sheet order information included within said objects of the one or more sheets reflecting said hierarchical relationship among the multiple objects of the one or more sheets based, at least in part, upon said received indication.

10. The storage medium of claim 9, wherein said executing instructions further operate to dynamically update the drawing sheets by the CAD application program to reflect the order changes resulted from the manipulation of the one or more graphical icons by the user.

11. The storage medium of claim 10, wherein said executing instructions further operate to dynamically update usage information of the drawing sheets by the CAD application program.

12. The storage medium of claim 11, wherein said executing instructions further operate to modify a "where used" field of the one or more drawing sheets.

13. The storage medium of claim 9, wherein said executing instructions further operate to store data representing the hierarchical relationship in a storage device.

14. The storage medium of claim 13, wherein said executing instructions further operate store data linking the one or more graphical icons of the objects of the one or more sheets included within the drawing by the CAD application program.

15. The storage medium of claim 9, wherein said executing instructions further operate to receive an Indication of the user defining and/or changing usage relationships of the components represented by the multiple objects of the one or more sheets.

16. The storage medium of claim 15, wherein said executing instructions further operate to receive an indication of the user dragging and dropping selected ones of the one or more icons among the multiple ones of the one or more objects.

17. An apparatus comprising:

a storage medium having stored therein a plurality of instructions that are machine executable, wherein when executed, said executing instructions operate to receive an indication of a manipulation of one or more graphical icons by a user, said graphical icons being interrelated to one another representing a hierarchical relationship among multiple objects of one or more sheets, said one or more sheets being included within a drawing by a computer aided design (CAD) application program, automatically modify a graphical representation representing the hierarchical relationship of the multiple objects, and to automatically modify at least sheet order information included within said objects of the one or more sheets reflecting said hierarchical relationship among the multiple objects of the one or more sheets based, at least in part, upon said received indication; and a processor coupled to said storage medium to execute said instructions.

18. The apparatus of claim 17, wherein said executing instructions further operate to dynamically update the drawing sheets by the CAD application program to reflect the order changes resulted from the manipulation of the one or more graphical icons by the user.

19. The apparatus of claim 18, wherein said executing instructions further operate to dynamically update usage information of the drawing sheets by the CAD application program.

20. The apparatus of claim 19, wherein said executing instructions further operate to modify a "where used" field of the one or more drawing sheets.

21. The apparatus of claim 17, wherein said executing instructions further operate to store data representing the hierarchical relationship in a storage device.

22. The apparatus of claim 21, wherein said executing instructions further operate store data linking the one or more graphical icons of the objects of the one or more sheets included within the drawing by the CAD application program.

23. The apparatus of claim 17, wherein said executing instructions further operate to receive an indication of the user defining and/or changing usage relationships of the components represented by the multiple objects of the one or more sheets.

24. The apparatus of claim 23, wherein said executing instructions further operate to receive and indication of the user dragging and dropping selected ones of the one or more icons among the multiple ones of the one or more objects.

* * * * *